United States Patent [19] [11] 4,403,226
Gaudioso [45] Sep. 6, 1983

[54] THERMAL MAGNETIC TAPE DUPLICATION METHOD EMPLOYING A REFLEX IMAGING MEMBER

[75] Inventor: Stephen L. Gaudioso, Webster, N.Y.
[73] Assignee: Xerox Corporation, Stamford, Conn.

[21] Appl. No.: 248,137
[22] Filed: Mar. 30, 1981
[51] Int. Cl.$^{3}$ .......... G01D 15/12
[52] U.S. Cl. .......... 346/74.4; 430/39
[58] Field of Search .......... 346/74.2, 74.4; 358/301; 430/39

[56] References Cited

U.S. PATENT DOCUMENTS

| | | | |
|---|---|---|---|
| 3,555,557 | 1/1971 | Nacci | 346/74.4 |
| 3,845,306 | 10/1974 | Kohlmannsperger | 346/74.2 |
| 3,987,491 | 10/1976 | Nelson | 346/74.2 |
| 4,068,239 | 1/1978 | Nelson | 346/74.7 |

*Primary Examiner*—Thomas H. Tarcza
*Attorney, Agent, or Firm*—Peter H. Kondo; Eugene O. Palazzo; John E. Beck

[57] ABSTRACT

This invention is directed to magnetic imaging method comprising creating a latent magnetic image on a reflex imaging member, transferring the latent image by thermoremanent duplication to a durable magnetic imaging member, developing the transferred image on the durable imaging member, and transferring the developed image to a receiving member. In one embodiment the present invention involves an improved magnetic imaging method which comprises (a) erasing and subsequently magnetizing a reflex magnetic imaging member with a D.C. magnetic field at an exposure of at least about 800 gauss in a direction parallel to the preferred axis of the aligned magnetic pigment particles in the magnetic grooves of said imaging member; (b) placing a document to be copied in contact with said imaging member; (c) directing light through said imaging member to said document and back to said imaging member by imagewise reflection from said document to expose the magnetic material in said imaging member and imagewise demagnetize said imaging member; (d) separating said document from said imaging member; (e) placing said imaging member in contact with a durable magnetic recording member; (f) directing light energy on to the rear of said durable magnetic recording member to said reflex imaging member to form a latent magnetic image on said durable magnetic recording member; (g) separating said reflex imaging member from said durable magnetic recording member; (h) contacting said durable magnetic recording member with magnetic toner particles to develop said latent magnetic image on said durable magnetic recording member; and (i) transferring the developed image from said durable magnetic recording member to a receiving member.

10 Claims, 1 Drawing Figure

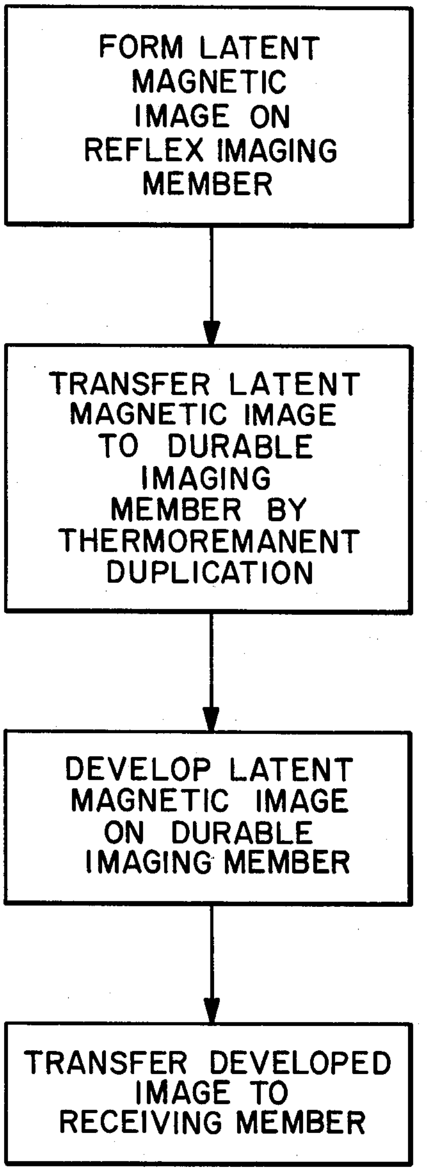
FORM LATENT MAGNETIC IMAGE ON REFLEX IMAGING MEMBER
TRANSFER LATENT MAGNETIC IMAGE TO DURABLE IMAGING MEMBER BY THERMOREMANENT DUPLICATION
DEVELOP LATENT MAGNETIC IMAGE ON DURABLE IMAGING MEMBER
TRANSFER DEVELOPED IMAGE TO RECEIVING MEMBER

THERMAL MAGNETIC TAPE DUPLICATION METHOD EMPLOYING A REFLEX IMAGING MEMBER

DESCRIPTION OF THE INVENTION

This invention relates to magnetic imaging and, more specifically, to an improved method of utilizing a reflex imaging member for the creation of a latent magnetic image, involving transferring the image to a more durable medium, and then developing and transferring the developed image in a copier/duplicator device.

As disclosed in U.S. Pat. No. 3,555,557, it is known to provide a process of reflex thermomagnetic recording by premagnetizing a magnetic recording member having a support transparent to light and particulate magnetic material opaque to light dispersed in discrete areas of the support. A document to be copied is placed in copying relationship with the recording member and light is directed through the recording member to the document and back to the recording member by imagewise reflection from the document. The light has an intensity sufficient to imagewise raise the temperature of the magnetic material in the recording member to about or above the Curie temperature of the magnetic material and imagewise demagnetize it. The formed latent magnetic image may be read out repeatedly by such means as magneto-optic read-out, or the magnetic image may be treated with a magnetic ink or magnetic toner particles which adhere magnetically to the magnetized portions of the recording member. The magnetic ink or magnetic toner is then transferred to paper or suitable substrate to form a copy of the original document.

It is also known from U.S. Pat. No. 3,845,306 to produce a magnetic image of an original by applying to a uniformly premagnetized surface a thermal image wherein the temperature of certain portions exceeds the Curie point. Such magnetic images can be converted into powder images by utilizing a magnetic toner. Further it is known to subject a layer of magnetizable toner to the action of an external magnetic field, and to simultaneously expose onto the magnetizable toner a thermal image wherein the temperature of certain portions exceeds the Curie point. This results in a selective removal or transfer of pulverulent toner so that the residual toner or the removed toner forms a powder image. It has also been proposed to contact a magnetic layer with a control layer wherein certain portions are heated to about or above the Curie point to thus provide on the magnetic layer a permanent magnetic image of the original.

After formation, the latent magnetic image may be developed, that is, made visible by contact with magnetic marking material such as a magnetic toner composition. Subsequent to development of the latent magnetic image, it is usually desirable to transfer the toner image from the magnetic imaging member to a permanent substrate such as paper. For this operation, there are basically two methods used in magnetographic printing. One method is by electrostatic means such as employing a corona device, and the other is pressure transfer. It has been found that pressure transferred images usually exhibit higher resolution than corona transferred images and offer a fusing advantage when fixed by flash or heat/pressure methods. However, most magnetic toner materials exhibit incomplete release or transfer from a magnetic imaging member, especially when using low transfer pressures. Previous attempts to pressure transfer developed dry magnetic toner images from a reflex magnetic imaging member to plain paper substrates have been notably unsuccessful. The transfer efficiency for nearly all toners has been less than approximately 75%, resulting in a significant amount of toner being impacted on the imaging member. Such toner had to be mechanically cleaned from the imaging member surface before re-exposure and/or subsequent development were carried out. In addition, it has been noted that significant abrasion, i.e., removal of the stripewise magnetic coating from its grooves and scratching of the transparent areas occurred on the imaging member as a result of the transfer process and the necessary post-transfer cleaning step thus rendering certain areas of the member useless for further imaging.

PRIOR ART STATEMENT

U.S. Pat. Nos. 3,987,491 and 4,068,239 relate to magnetic image transfer and imaging apparatus. These patents are directed to magnetic toner imaging in which a magnetic image is formed on a chromium oxide and resin binder sheet. The magnetic image is then transferred to a drum printing member having a layer of nickel cobalt, developed with toner, and then pressure-transferred therefrom to a receiving sheet. U.S. Pat. No. 3,852,525 contains a similar teaching wherein there is disclosed the use of a metallic permalloy surface as the printing member. In the aforementioned patents, a reflex imaging member is employed to capture the original image information via reflex optical means. The magnetic latent image formed is subsequently duplicated by known anhysteretic bias recording methods onto the aforementioned printing members, thus, decoupling the initial image capture step from the actual marking process when using a reflex magnetic imaging member is known.

Significant advantages have been identified for a copier/duplicator device employing reflex thermoremanent magnetic imaging technology. Apparent advantages include the elimination of lens optics and high voltage requirements, the facility of pressure transfer, the use of single-component developer, reusable imaging substrates, and use of plain paper receiving members. However, one of the limitations to the application of the afore-described technology to a conventional copier/duplicator product is the useful life of the reflex imaging member required for the process. Such an imaging member typically consists of a thin, e.g., several mils, transparent substrate having shallow grooves on the order of less than about 10 microns in one surface at a line frequency of about 500 grooves per inch. These grooves are filled with a hardened magnetic pigment and resin binder coating in which the magnetic pigment particles are preferentially oriented in plane perpendicular to the groove axis. In a conventional copier/duplicator device, the magnetic imaging member would first be pre-magnetized, then reflex exposed with a suitable flash lamp, the magnetic latent image developed with an appropriate magnetic toner, the developed image transferred to a copy substrate, and the imaging member cleaned prior to re-exposure/re-development. However, when pressure-transfer is utilized to transfer the developed image onto the copy substrate receiving member, or when mechanical cleaning members are employed to remove residual toner particles from the imaging member, a significant likelihood exists for abrasive damage to occur to the imaging member resulting in a deterioration of the imaging capability of the member. In addition, the reflex imaging member can be rendered inoperative by impaction of toner particles thereon to its active surface. Further, there also exists the likelihood of contaminating an original document brought into contact with a soiled imaging member during the exposure step. Therefore, there is a need for an improved method of providing superior duplicated images employing reflex imaging members which overcomes the above-noted disadvantages.

SUMMARY OF THE INVENTION

It is an object of this invention to provide an improved method of transferring toner images from a magnetic imaging member to a receiving substrate.

It is a further object of this invention to provide an improved method of developing a magnetic latent image.

It is yet another object of this invention to provide a method of employing a reflex imaging member which extends the useful life of the imaging member.

It is still another object of this invention to provide an improved method of forming duplicated images wherein increased transfer pressures may be employed without causing toner impaction to a reflex imaging member.

It is yet a further object of this invention to provide an improved method of forming duplicated images wherein abrasive damage to a reflex imaging member is avoided.

These and other objects of this invention will be apparent from a reading of the following description of the invention.

In accordance with the present invention, there is provided a magnetic imaging method comprising creating a latent magnetic image on a reflex imaging member, transferring the latent magnetic image by thermoremanent duplication means on to a durable magnetic imaging member, developing the latent magnetic image on said durable magnetic imaging member, and transferring the developed magnetic image from the durable magnetic imaging member to a receiving member such as paper. By this invention, it is thus possible to employ one or more thermoremanent duplication steps, not previously demonstrated, to successfully decouple the magnetic latent image capture step from the marking process and to achieve appropriate image-sense reproduction for typical opaque originals. Since the reflex imaging member is readily erased by thermal means at temperatures about or above the Curie point of the magnetic component, the initial duplication step is performed under conditions which do not permit the reflex member to become heated above said Curie Point. By Curie Point is meant the temperature at which the magnetic properties of a material change from ferromagnetic to paramagnetic.

BRIEF DESCRIPTION OF THE DRAWINGS

The drawing summarizes the steps of the invention.

More specifically, the method of the present invention comprises the steps of thermally erasing and subsequently magnetizing a reflex magnetic imaging member with a D.C. magnetic field at an exposure of at least about 800 gauss in a direction parallel to the preferred or "easy" magnetic axis of the aligned magnetic particles in the imaging member, placing a document to be copied in contact with the imaging member, directing light through the imaging member to the document to be copied and back to the imaging member by imagewise reflection from the document to expose the magnetic material in the imaging member and imagewise demagnetize the imaging member, followed by separating the document to be copied from the imaging member, placing the reflex imaging member in contact with a durable magnetic recording member, directing suitable light energy on the rear of the durable magnetic recording member to form a latent magnetic image thereon, separating the reflex imaging member from the durable magnetic recording member, contacting the durable magnetic recording member with magnetic toner particles to develop the latent magnetic image on said durable magnetic recording member, and transferring the developed image from said durable magnetic recording member to a receiving member.

In the first step of the practice of this invention, as summarized by the first block in the drawing, after magnetization, the reflex imaging member is preferably held in contact with an original document to be copied by suitable means such as by vacuum and exposed with a suitable light source such as a xenon lamp at a flash energy of between about 1.5 joules and about 8.5 joules per square inch for between about 0.1 and about 10.0 milliseconds. The light source energy must be sufficient to raise the temperature of the magnetic particles in the imaging member to about or above their Curie temperature. The remaining magnetized image areas form a latent magnetic image. After separating the original document from the reflex imaging member, as summarized by the second block in the drawing, the reflex imaging member is contacted with the durable magnetic imaging member which is likewise exposed with a suitable light source such as a xenon lamp at a flash energy of between about 4 joules and about 8 joules per square inch for between about 0.1 and about 10.0 milliseconds. The durable magnetic imaging member preferably contains chromium dioxide as this material has a relatively low Curie Point of about 125° C., and has a relatively high coercivity and high remanence.

When a right-reading original is utilized for the creation of the initial latent image on the reflex member and the original is placed in face-to-face contact with the reflex member; i.e. the image bearing surface of the original is contacted with the magnetic groove bearing surface of the reflex member, the subsequently duped image on the durable magnetic recording member will also be right-reading. Accordingly, the copies produced from such an image will be wrong-reading, which may be undesirable in some applications. In order to form right-reading copies, a number of methods can be employed, including the following two examples. In the first, the first duped image (right-reading) on the durable magnetic recording member can be duped in analogous fashion to a second durable magnetic recording member. The second duped image (wrong-reading), when developed and transferred to a receiving member, will produce right-reading copies. In the second method, which is preferred, the image sense of the initial latent image on the reflex member can be inverted; i.e. wrong-reading to right-reading, by placing the image bearing surface of the right-reading original in contact with the rear surface (opposite to the magnetic groove bearing surface) of the reflex member. The subsequent duped image on the durable magnetic recording member will then be wrong-reading. Accordingly, the copies produced from such an image will be right-reading.

As summarized in the third block in the drawing, the latent magnetic image formed on the durable magnetic imaging is then contacted with magnetic toner material in liquid or dry, particulate form to provide a visible image. The developed image is then contacted with a receiving member such as paper and transferred thereto by electrostatic or pressure means. After transfer of the developed image to the receiving member, it is fixed thereto by any suitable means such as radiant heat, solvent, flash lamp, pressure, or any combination thereof. For example, typical suitable fixing means include heating the toner in the developed image to cause the resins thereof to at least partially melt and become adhered to the receiving member, the application of pressure to the toner being optionally accomplished with heating such as the use of a heated roller, solvent or solvent vapor to at least partially dissolve the resin component of toner, or any combination of the above. In addition, the developed image may be contacted with the receiving member to which pressure is applied and the image thereby transferred and fixed thereto. Typically, the image pressure transfer means comprises at least a pair of transfer rollers or a transfer roller and an idler roller.

The magnetizable toner composition utilized for development of the magnetic latent image preferably comprises a resinous material that can be fused to the receiving medium when brought into contact therewith under pressure. It will be understood that additional fixing need not occur at the transfer station but can optionally be provided downstream. In such a situation, a separate fusing station having conventional fusing means can be employed. While the receiving medium may be fed from a supply roll, it will be appreciated that the receiving medium may be provided in any form, e.g., sheet, strip, web, etc.

Subsequent to transfer of the latent magnetic image to the durable magnetic imaging member, the reflex imaging member may be passed adjacent to an erase means suitably energized by a power source prior to re-magnetization. Further, the imaging members may be provided in the form of endless webs or tapes traveling over rollers.

Various suitable durable magnetic imaging member may be employed in the process of this invention. Typical durable magnetic imaging members comprise a film, base, or web containing a magnetizable material such as a magnetic tape having a magnetic recording surface. For example, the durable imaging member may comprise a magnetic tape having a chromium dioxide recording surface sold under the tradename Crolyn ® by E. I. duPont Company, Wilmington, Delaware. Especially preferred as magnetic imaging members are those having a continuous magnetic recording surface.

Any suitable development technique can be employed for the development of the magnetic latent image residing on the durable imaging member. Typical suitable development methods include cascade development, powder cloud development, and floor development. It will be appreciated, of course, that electrostatic transfer techniques may be employed. In that case, the toner utilized at the development station comprises an electrostatically attractable component.

Various suitable magnetizable toner compositions may be employed in the imaging method of this invention. Typical magnetizable toner compositions include an electrostatically attractable component such as gum copal, gum sandarac, cumarone-indene resin, asphaltum, gilsonite, phenolformaldehyde resins, resin-modified phenolformaldehyde resins, methacrylic resins, polystyrene resins, epoxy resins, polyester resins, polyamide resins, polyethylene resins, vinyl chloride resins, and copolymers or mixtures thereof. The particular toner material to be employed may be selected depending upon its triboelectric properties where such is a consideration depending upon its triboelectric properties where such is a consideration. However, the preferred toner materials are those having a relatively soft, in terms of yield stress, resin component such as polyethylene, polyethylene vinyl acetate, carnauba wax, polyhexamethylene sebacate, polyethylene glycol, and blends or copolymers of these materials with other resins as they provide excellent fixing properties. Among the patents describing toner compositions are U.S. Pat. No. 2,659,670 issued to Copley; U.S. Pat. No. 2,753,308 issued to Landrigan; U.S. Pat. No. 3,070,342 issued to Insalaco; U.S. Reissue No. 25,136 to Carlson, and U.S. Pat. No. 2,782,288 issued to Rheinfrank et al. These toners generally have an average particle diameter in the range substantially 5 to 30 microns, however, 5 to 15 microns is preferred.

Illustrative examples of pigments or dyes that may be employed as a colorant for the toner particles are well known, and include, for example, carbon black, black dye such as Nigrosine dyes, aniline blue, Calco Oil Blue, chrome yellow, ultramarine blue, Quinoline Yellow, methylene blue chloride, Monastral Blue, Malachite Green Oxalate, lampblack, Rose Bengal, Monastral Red, Sudan Black BN, and mixtures thereof. The pigment or dye should be present in the toner in a sufficient quantity to render it highly colored so that it will form a clearly visible image on a recording member.

Examples of magnetic or magnetizable substance that may be employed as the magnetically attractable component for the toner particles include metals such as iron, nickel, cobalt, ferrites containing nickel, zinc, cadmium, barium, and manganese; metal oxides such as $CrO_2$, $\gamma$-$Fe_2O_3$ and $Fe_3O_4$ or magnetite and hematite; metal alloys such as nickel-iron, nickel-cobalt-iron, aluminum-nickel-cobalt, copper-nickel-cobalt, and cobalt-platinum-manganese. Preferred for the instant process are magnetite particles as they are black in color, low cost and provide excellent magnetic properties. The magnetic component particles may be of any shape and any size which results in magnetic toner particles having excellent transfer properties. Generally, the magnetic component particles may range in size from about 0.02 micron to about 1 micron. A preferred average particle size for the magnetic component particles is from about 0.1 to about 0.5 micron in their maximum dimension. The magnetic component particles may be any shape, including acicular or polyhedral. The magnetically attractable component may be present in the toner particles in the amount of between about 20% by weight and about 90% by weight based on the weight of the toner composition.

The following examples further define and describe the imaging method of the present invention to develop latent magnetic images. Parts and percentages are by weight unless otherwise indicated.

EXAMPLE I

A segment of magnetizable reflex imaging material obtained from the duPont Company was thermally erased and subsequently magnetized with a D.C. field having a magnetic strength of about 800 gauss in a direction parallel to the preferred or "easy", in plane magnetic axis of the aligned pigment particles in the magnetic grooves. The uniformly premagnetized imaging member was held in contact by vacuum with an original to be copied comprising a sheet of white paper containing black line and solid area print thereon and exposed with a xenon flash lamp at an energy of about 4 joules per square inch for about 1.0 milliseconds. The original to be copied was separated from the imaging member and the imaging member was flooded with a magnetic toner composition to develop the latent magnetic image formed on the imaging member. The toner composition comprised about 65 parts of magnetite and about 35 parts of hexamethylene sebacate polymer. The imaging member was then "sandwiched" between 2 sheets of Xerox ® 1024 paper and passed between two 3" diameter steel rolls using about 35 pli pressure at a speed of about 5 inches/second.

After separation of the receiving member from the imaging member, it was found that the toner transfer to the receiving member was less than approximately 75%. This procedure was repeated 10 times resulting in a significant amount of toner particles being impacted on the imaging member. This, in turn, had to be mechanically cleaned from the imaging member surface before re-exposure and/or subsequent development were carried out. In addition, it was noted that significant abrasion, i.e. removal of the stripewise magnetic coating from its grooves and scratching of the transparent areas occurred on the imaging member as a result of the transfer process and the necessary post-transfer cleaning step, and certain areas of the imaging member were rendered useless for further imaging.

EXAMPLE II

A segment of magnetizable reflex imaging material obtained from the duPont Company was thermally erased and subsequently magnetized with a D.C. field having a magnetic strength of about 800 gauss in a direction parallel to the preferred or "easy" in plane magnetic axis of the aligned pigment particles in the magnetic grooves. The uniformly premagnetized imaging member was held in contact by vacuum with an original to be copied comprising a sheet of white paper containing black line and solid area print thereon and exposed with a xenon flash lamp at an energy of about 4 joules per square inch for about 1.0 millisecond. The original to be copied was separated from the imaging member and the imaging member was placed in contact with a segment of unrecorded, aluminized, Crolyn ® magnetic recording tape available from the duPont Company. A xenon lamp at an energy of about 7 joules per square inch was flashed through the substrate or back of the Crolyn ® magnetic recording tape for about 1.0 millisecond. After separation of the magnetic imaging members, the Crolyn ® magnetic recording tape was developed with magnetic toner to provide an image corresponding to the original document. The toner composition comprised about 65 parts of magnetite and about 35 parts of hexamethylene sebacate polymer. The developed Crolyn ® recording tape was then contacted with a piece of ordinary Xerox ® 1024 bond paper and both were simultaneously passed through the nip of a pair of stainless steel rollers each having a diameter of about 3 inches loaded at a pressure of about 35 pounds per lineal inch at a speed of about 5 inches/second. The receiving member was separated from the recording tape and, upon examination, it was found that most of the toner originally present on the recording tape was transferred to the receiving member. The recording tape segment was cleaned and the foregoing steps repeated about 20 times. Each print was evaluated for print density. The reflex imaging member segment was examined for toner residue and toner film build-up, and there was observed no change in the reflectance density of 1.4 as measured on either the first or last prints no toner residue or film was visually observed on the reflex imaging member, and no damage to the reflex imaging member was observed.

In summary, in addition to prolonging the useful life of reflex magnetic imaging members by protecting them from abrasive environments, this invention provides additional advantages. As earlier indicated, the imaging method of this invention significantly reduces the opportunity for contamination of original documents brought into contact with the reflex imaging member. Contamination of originals by stray or unremoved toner is much less likely due to the fact that the reflex imaging member is not utilized for development and transfer of toner material. Further, the durable magnetic imaging member which is used for the development or marking process can be subjected to rather vigorous cleaning action prior to re-contact with the reflex imaging member. Also, separation of the magnetic latent image creation process from the marking process allows a much wider variety of process options and/or system architectures to be devised depending upon the application desired. For example, a single magnetic master-maker might provide reusable masters for several marking engines at decentralized locations. As another example, the productivity of the printer can be significantly enhanced by running at a higher process speed without the need to slow down or stop for exposure if automatic master-feed/master-eject components are added to the printer.

Although specific materials are set forth in the foregoing examples, these are merely intended as illustrations of the present invention. Various other suitable resins, imaging members, magnetic substances, additives, pigments, colorants, and/or other components may be substituted for those in the specification with similar results. Other materials may also be added to the toner to sensitize, synergize or otherwise improve the fusing properties or other properties of the system.

Other modifications of the present invention will occur to those skilled in the art upon a reading of the present disclosure. These are intended to be included within the scope of this invention.

What is claimed is:

1. A magnetic imaging method comprising the steps of:

(a) creating a latent magnetic image on a reflex imaging member;

(b) transferring said latent magnetic image by thermoremanent duplication to a durable magnetic imaging member;

(c) developing said latent magnetic image on said durable magnetic imaging member; and (d) transferring the developed image from said durable magnetic imaging member to a receiving member.

2. A magnetic imaging method in accordance with claim 1 including fixing said developed image to said receiving member.

3. A magnetic imaging method in accordance with claim 1 wherein said receiving member comprises paper.

4. A magnetic imaging method comprising the steps of:

(a) erasing and subsequently magnetizing a reflex magnetic imaging member with a D.C. magnetic field at an exposure of at least about 800 gauss in a direction parallel to the preferred axis of the aligned magnetic pigment particles in the magnetic grooves of said imaging member;

(b) placing a document to be copied in contact with said imaging member;

(c) directing light through said imaging member to said document and back to said imaging member by imagewise reflection from said document to expose the magnetic material in said imaging member and imagewise demagnetize said imaging member;

(d) separating said document from said imaging member;

(e) placing said imaging member in contact with a durable magnetic recording member;

(f) directing light energy on to the rear of said durable magnetic recording member to said reflex imaging member to form a latent magnetic image on said durable magnetic recording member;

(g) separating said reflex imaging member from said durable magnetic recording member;

(h) contacting said durable magnetic recording member with magnetic toner particles to develop said latent magnetic image on said durable magnetic recording member; and (i) transferring the developed image from said durable magnetic recording member to a receiving member.

5. A magnetic imaging method in accordance with claim 4 wherein said reflex imaging member is exposed with a flash energy of between about 1.5 joules and about 8.5 joules per square inch for between about 0.1 and about 10.0 milliseconds.

6. A magnetic imaging method in accordance with claim 4 wherein said durable magnetic recording member is exposed with a flash energy of between about 4 joules and about 8 joules per square inch for between about 0.1 and about 10.0 milliseconds.

7. A magnetic imaging method in accordance with claim 4 wherein said receiving member comprises paper.

8. A magnetic imaging method in accordance with claim 4 wherein said magnetic toner particles comprise a resinous material and a magnetically attractable component.

9. A magnetic imaging method in accordance with claim 4 including fixing said developed image to said receiving member.

10. A magnetic imaging method in accordance with claim 4 wherein said durable magnetic recording member comprises a magnetic tape having a chromium dioxide recording surface.

* * * * *